United States Patent Office 3,221,745
Patented Dec. 7, 1965

3,221,745
METHOD OF BONDING BODY TISSUE TOGETHER USING METHYLENEMALONIC ACID ESTERS
Harry W. Coover, Jr., Kingsport, Tenn., and Newton H. Shearer, Jr., Zurich, Switzerland, assignors to Eastman Kodak Company, Rochester, N.Y., a corporation of New Jersey
No Drawing. Filed Sept. 12, 1962, Ser. No. 223,241
4 Claims. (Cl. 128—334)

This application is a continuation-in-part of our copending application Serial No. 63,463, filed October 19, 1960, now abandoned.

This invention relates to a method for the surgical bonding of tissues by the use of a rapid-setting adhesive composition and to novel adhesive compositions adapted for surgical use. More particularly, it relates to the surgical use of novel compositions comprising monomeric dialkyl esters of methylenemalonic acid.

The usual methods for closing incisions in flesh and for setting bone fractures, by the use of sutures, clamps, pins or the like, have many drawbacks. The use of an adhesive substance for these surgical purposes has the advantage of permitting rapid joining of the damaged members and of permitting natural healing. However, the common adhesives are unsuitable for surgical purposes. Most adhesives need too much time to form a bond. Many require the use of heat or pressure or the evaporation of a solvent, all of which make them unsuitable as surgical adhesives. Furthermore, many adhesives, including some that might otherwise be suitable for surgical use, are irritating to the body tissues.

The present invention is based on our discovery that monomeric dialkyl esters of methylenemalonic acid are unexpectedly useful for bonding living tissues. We have, accordingly, developed a novel method for the surgical bonding of tissue with such esters and novel surgical adhesive compositions containing such esters. Without the use of heat or pressure, our novel compositions form rapid-setting bonds of sufficient strength for closing flesh incisions, setting bones, etc. The novel adhesive compositions form bonds that do not interfere with natural healing and that are assimilated by the body without toxic effects. Other advantages will appear in the discussion hereinafter.

The method of our invention for bonding separated surfaces of body tissues, in general, comprises applying to at least one of such surfaces a thin film of an adhesive composition comprising a monomeric dialkyl ester of methylenemalonic acid, bringing together the surfaces to be bonded and polymerizing the thin film of monomer while in contact with both of the surfaces.

The adhesive compositions of the invention comprise, as the major active constituent, a monomeric dialkyl ester of methylenemalonic acid prepared in high purity, preferably in admixture with one or more substances, such as, an acidic polymerization inhibitor, an antiseptic, a thickening agent, a plasticizer or the like, adapted to improve the surgical utility of the monomer.

The esters of methylenemalonic acid that are effective in accordance with the invention are represented by the formula:

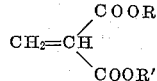

wherein R and R' are the same or different alkyl radicals of 1 to about 8 carbon atoms. Typical examples of such monomeric esters that can be employed in accordance with the invention include dimethyl methylenemalonate, diethyl methylenemalonate, di-n-propyl methylenemalonate, diisobutyl methylenemalonate, methyl ethyl methylenemalonate, di-n-butyl methylenemalonate, di-n-amyl methylenemalonate, di-2-ethylhexyl methylenemalonate, di-n-octyl methylenemalonate, methyl n-octyl methylenemalonate and related esters of methylenemalonic acid.

Descriptions of the preparation of dialkyl methylenemalonates are in the literature. However, the standard procedures yield products that are not useful as adhesives. We have found that for use as a surgical adhesive the methylenemalonate monomer must be synthesized in high purity. Even though the monomer is later blended with other substances to form an adhesive composition it should be synthesized initially in high purity. If the monomer is synthesized even with small amounts of impurities that influence polymerization the adhesive utility will be impaired. Acidic impurities prevent the anionic polymerization of the monomers and lead to sluggish or ineffective adhesive activity. Basic impurities accelerate the anionic polymerization and lead to products that are unstable and useless as adhesives because they polymerize prematurely. The preferred surgical compositions of the invention comprise the methylenemalonate monomer synthesized in such a manner as to contain no more than about 100 parts by weight of impurities per million parts of monomer (abbreviated hereinafter as "p.p.m."). The especially preferred compositions of the highest adhesive activity for surgical purposes comprise the methylenemalonate monomer synthesized so as to contain no more than 10 p.p.m. of impurities that accelerate or retard polymerization. The monomer can be blended with minor amounts of additives, as discussed hereinafter, to form compositions comprising methylenemalonate monomers as the major component. In such compositions the monomer is preferably at least about 75 weight percent of the composition. Even in such mixtures, the monomer must have been prepared in high purity, preferably with less than 100 p.p.m. impurities.

Our preferred method for preparing the high purity monomeric esters having utility as surgical adhesives is a modification of the method described in Organic Syntheses, vol. 38, pages 22–25 (John Wiley and Sons, Inc., New York, 1958). Our modification of the procedure produces monomeric methylenemalonates of a quality that has not previously been reported.

In our preferred method the monomeric esters are prepared by hydrogenating the olefinic bond of a dialkyl alkoxy-methylenemalonate and pyrolyzing the reaction product. The reactions can be represented by the following equations:

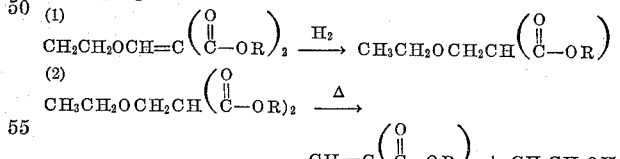

Suitable hydrogenation catalysts for reaction (1) include Raney nickel, palladium on an alumina support, and other hydrogenation catalysts adapted to hydrogenate selectively the olefinic double bonds of unsaturated carbonyl compounds rather than the carbonyl double bonds. In our improved method the pyrolysis reaction (2) is effected in the presence of a polymerization inhibitor, such as phosphorous pentoxide, to inhibit polymerization of the unsaturated monomer and the pyrolysis product is vacuum distilled at a low temperature to prevent contamination of the monomer with pyrolytic products that commonly result from high temperature distillation.

The important differences between our improved method of preparation and the method of the Organic Syntheses citation include the use of a polymerization inhibitor in the pyrolysis step and the use of low pressure for distilling the pyrolysis product. By the use of our improved method, and particularly by the use of a polymerization inhibitor in the pyrolysis step, we obtain the methylenemalonate monomers in very high purity. The high purity methylenemalonate monomers are excellent adhesives. They polymerize and form firm bonds in situ rapidly, usually within seconds.

The indicated esters of methylenemalonic acid polymerize from the liquid to the solid state by an anionic polymerization mechanism and have a marked affinity for adhering to living tissue. We are not certain of the reason for this affinity but we believe that the highly polar nature of the ester molecule is responsible because the living tissues such as skin and bone are known to be polar. Since the polymerization of the ester monomer is initiated by anionic attack, the polymerization is accelerated somewhat when the monomer comes into contact with the slightly basic body fluids. If desired, the polymerization of the monomer can be further accelerated to obtain a more rapid bond by the use of a basic catalyst such as an amine or an alcohol. The catalyst can be added to the adhesive just before use or to the surface to be adhered.

The methylenemalonic acid esters can be used alone in the method of the invention. However, advantageously, compositions of the invention are used in which the high purity methylenemalonic acid ester is mixed with one or more substances such as a thickening agent, plasticizer, antibiotics or the like. If such materials are added to the ester before the intended adhesive use they must be materials that will not cause the monomer to polymerize. Examples of suitable thickening agents or viscosity modifiers include various polymeric or resinous materials such as polymeric α-cyanoacrylic esters, poly(acrylates), poly(methacrylates), cellulose esters etc., and typical of such plasticizers are dimethyl sebacate, di-n-butyl sebacate, di-n-octyl phthalate, tricresyl phosphate, glyceryl triacetate, glyceryl tributyrate, diethyl sebacate and other plasticizer esters of the types disclosed in the patent to Joyner and Coover, U.S. 2,784,127.

The surgical adhesive compositions of the invention can contain up to about 20 percent by weight, based on the methylene malonate monomer, of the described polymeric thickening agent or viscosity modifier and up to about 20 percent by weight based on the monomer of the described plasticizers. Preferably, for rapid adhesive action the amount of plasticizer is about 1 to 5 percent by weight based on the monomer. In this preferred range the ester plasticizers improve the flexibility of the adhesive bond without adversely affecting the adhesive qualities of the composition.

As we have indicated, the adhesive compositions can be used for surgical and dental purposes, including uses in vascular surgery; in the bonding of tissue, skin and bones; and in the bonding of teeth to tissue or to bones in the mouth. A thin film of the adhesive composition is applied by means of a sterile brush or other applicator or by spray to one or both of the surfaces to be bonded. For bone fractures the adhesive can be injected by needle to the fractured surfaces.

As we have indicated, a catalyst or accelerator can be used to obtain a more rapid bond. However, these would not be added to the methylenemalonic acid ester any substantial length of time before the surgical use because that would cause the monomer to polymerize prematurely. The catalysts are used by application to the surfaces of the tissues to be bonded. The adhesive monomer is applied to the same or to the other surface and the two surfaces are promptly brought together and held in place until a bond is formed. Normally, this requires only a few seconds. Suitable polymerization catalysts or accelerators are those that have no adverse affect on the tissues being treated and include solutions of aliphatic alcohols such as methanol, isobutanol, capryl alcohol, etc.; and of such basic materials as ammonia, piperidine, pyridine, etc.

While the esters of methylenemalonic acid have reasonably good stability as monomers when stored in bulk, especially when the esters are of high purity, polymerization inhibitors can be used to increase the storage stability. Suitable inhibitors or stabilizers that can be used in small amounts, e.g., 0.0001 to 0.01 weight percent, include sulfur dioxide, hydroquinone, nitric oxide, organic acids, etc. The preferred stabilizers are those having the least adverse physiological affect.

Suitable antiseptics for the adhesive compositions based on methylenemalonate monomers include bisphenols of which 2,2'-thiobis(4-chlorophenol) and 2,2'-methylenebis(4-chlorophenol) are examples. The various quaternary ammonium compounds may also be used with the adhesives but they will cause premature polymerization if incorporated in the formulation for prolonged storage. Antibiotic preparations can also be used with the dialkyl methylenemalonates, but incorporation of the antibiotic in the adhesive formulation will render it unstable to storage. Among antibiotics which may be used are: penicillin, streptomycin, aureomycin, chloramphenicol and oxytetracycline. If basic materials are used with the adhesive, they should be mixed immediately prior to use or preferably applied prior to the application of the adhesive.

Adhesive compositions of the invention form strong bonds with all types of human and animal tissues. The bonds are strongest when a minimal amount of adhesive is applied. This makes it possible for the normal fibroblasts and other cellular elements of healing to penetrate rapidly through the bond where necessary to permit the natural healing process to take place. As we have indicated, the slightly alkaline pH of the body fluids act as a natural catalyst to the polymerization of the monomer. Some body fluids interfere with the formation of the bond and must be controlled. For example, in dental use excessive moisture can cause difficulties and should be eliminated insofar as possible. Another difficulty that can be encountered is the difficulty of eliminating contact of the adhesive with tissue underlying the tissue that it is desired to bond. When this happens, adhesions can form that make an undesirable wound closure. These difficulties are mentioned to show that skillful manipulation of the adhesive is required for best results. Despite these difficulties the fact remains that the novel adhesive compositions provide a valuable new means for achieving surgical bonding.

The practice of the method of the invention is further illustrated by the following examples.

The first example illustrates the preparation of dimethyl methylenemalonate.

*Example 1*

(a)

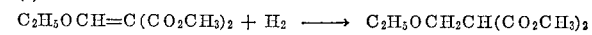

A mixture of 0.78 mole (147 g.) of dimethyl ethoxymethylenemalonate dissolved in 175 ml. of absolute ethanol was reduced in a low pressure hydrogenation apparatus using 6.5 g. of palladium on alumina catalyst and hydrogen at 40 p.s.i. and 45° C. until 0.78 mole hydrogen was absorbed. Catalyst was removed from the reduction product by filtration using a filter aid to remove suspended catalyst particles. The ethanol was distilled off under reduced pressure to a final pot temperature of 110° C. to give a residue of 142.5 g.

(b)

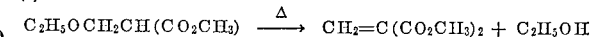

The above residue of 142.5 g. was placed in a 250 ml., three-necked flask to which was added 3.0 g. P$_2$O$_5$ and 1.5 g. hydroquinone. The flask was equipped with a magnetic stirrer and thermometer and was attached to a 6-inch packed column fitted with a still head and receiver.

A total of 15.3 g. of liquid was collected during a heating interval of 40 minutes as the pot temperature climbed from 133° to 193° C. The flask was cooled somewhat, a sulfur dioxide inlet tube was added to the pot and the mixture was distilled at low pressure in a stream of sulfur dioxide to give a fraction, B.P. 57–58 (2.6–2.9 mm.), weight 52 g. This fraction was redistilled to give a final product B.P. 59–63° C. (2.8 mm.). The products were collected in Dry Ice cooled receivers.

The next example illustrates preparation of another ester of methylenemalonic acid, namely, the diethyl ester.

Example 2

A mixture of 0.78 mole (168.2 g.) of freshly distilled diethyl ethoxymethylenemalonate in 175 ml. of ethanol was reduced in a low-pressure hydrogenation apparatus using 4 g. of palladium on alumina catalyst and hydrogen at 45 p.s.i. and at a temperature of 45° C. After 0.8 mole of hydrogen had been taken up in the reaction, the reduction was stopped and the catalyst was separated from the mixture by filtration using a filter aid. The ethanol solvent was distilled off under reduced pressure leaving a 160 g. residue of diethyl ethoxymethylmalonate. The diethyl ethoxymethylmalonate was then pyrolyzed in a 250 ml. three-necked flask in the presence of 1.5 g. of phosphorous pentoxide. The flask was fitted with a magnetic stirrer and a thermometer and was attached to a six inch Hastelloy B packed column fitted with a still head and receiver. The flask charge was heated and 24.7 g. of ethanol was collected while the reaction mixture in the flask was raised from 135° C. to 180° C. The reaction mixture was cooled, 0.5 g. of hydroquinone was added, and the residue was distilled under reduced pressure to give 103.1 g. of monomeric diethyl methylenemalonate, B.P. 66–69° C. at 2.9 mm. The resulting product was again distilled and the product collected at 67.5–70° C. at 3 to 3.2 mm. and having $n_D^{20}$ 1.4314. The refractive index was taken on a refractometer whose prisms had been washed with acetic acid to remove basic substances and to inhibit polymerization. Care was taken to use a large drop of monomer and to separate the prisms as rapidly as possible after the reading had been obtained.

The remaining examples illustrate surgical uses of dimethyl methylenemalonate monomer prepared in the manner of Example 1. Although the monomer can be admixed with various additives, in these examples the unmodified methylenemalonate monomer was used. It will be understood that in the examples strict surgical procedures are followed when necessary to prevent contamination of the incision or fracture by instruments, bandages, adhesive or fluids.

Example 3

A monomeric sample of dimethyl methylenemalonate was used to close a three-inch incision in a mongrel dog. The sides of the incision were held in place while the adhesive was applied with a sterile brush. After the monomer had polymerized, the sides of the incision were observed to be perfectly matched. After a period of several days, the incision had healed completely with only a very fine scar being produced.

The next example illustrates the use of a promoter or bonding accelerator with dimethyl methylenemalonate.

Example 4

Monomeric dimethyl methylenemalonate promoted with an ethanol solution of triethylamine was used to suture a two-inch incision on the stomach of a guinea pig. The area around the incision was moistened with a 1 percent ethanol solution of triethylamine on a piece of sterile cotton. The dimethyl methylenemalonate was painted over the incision with a small artist's brush. Three coats of adhesive were used to insure a good film over the wound. After several days, the incision had healed neatly with only a fine scar being produced.

The next example illustrates the use of dimethyl methylenemalonate for the joining of bones.

Example 5

A leg bone in a mongrel dog which had been broken was treated as follows: The two pieces were aligned and the area of the break was sterilized. Then, dimethyl methylenemalonate was injected into the fracture site from three points equidistant around the bone. Within ten minutes, the adhesive had hardened and the leg was "set." The break knitted together without splints and the dog was able to walk without restriction.

Tests have also been performed that illustrate an advantage of the dialkyl methylenemalonates over methyl 2-cyanoacrylate, another substance that has been used as a surgical adhesive. Injections of one-gram portions of methyl 2-cyanoacrylate were made in one group of dogs and of dimethyl methylenemalonate in another group. After two or three weeks swelling and subsequent purulence were observed at the sites of injection of the methyl 2-cyanoacrylate. In contrast, over a ten-week period no adverse effect was observed in the dogs injected with dimethyl methylenemalonate.

The invention has been described in considerable detail with particular reference to certain preferred embodiments thereof, but it will be understood that variations and modifications can be effected within the spirit and scope of the invention as described hereinabove, and as defined in the appended claims.

We claim:
1. The method for surgical bonding of body tissues which comprises applying to at least one of the tissue surfaces to be bonded a thin film of an adhesive composition comprising a monomeric dialkyl ester of methylenemalonic acid, bringing together the surfaces to be bonded and polymerizing the thin film of monomer while in contact with such surfaces.

2. The method according to claim 1 in which the alkyl radicals of said dialkyl ester of methylenemalonic acid have from 1 to 8 carbon atoms.

3. The method for surgical bonding of body tissues which comprises applying to at least one of the tissue surfaces to be bonded a thin film of an adhesive composition comprising a monomeric dialkyl ester of methylenemalonic acid of which the alkyl radicals have from 1 to 8 carbon atoms, bringing together the surfaces to be bonded and polymerizing the thin film of monomer while in contact with such surfaces, said ester having been prepared by hydrogenating the olefinic bond of a dialkyl alkoxy methylenemalonate, pyrolyzing the hydrogenation product in the presence of a polymerization inhibitor and vacuum distilling the pyrolysis product to obtain said ester in high purity.

4. The method according to claim 3 in which said adhesive composition contains a minor amount of at least one substance from the group consisting of a plasticizer ester and a polymeric thickening agent.

References Cited by the Examiner

UNITED STATES PATENTS 2,212,506  8/1940  Bachman et al. _____ 260—78.4
2,330,033  9/1943  D'Alelio _____ 260—485

OTHER REFERENCES

Carton et al., "A Plastic Adhesive Method of Small Blood Vessel Surgery," from World Neurology, vol. 1, 1960, pages 356–61.

Natham et al., "Nonsuture Closure of Arterial Incisions Using a Rapidly Polymerizing Adhesive," from Annals of Surgery, vol. 152, 1960, pages 648–59.

RICHARD A. GAUDET, *Primary Examiner.*

JORDAN FRANKLIN, *Examiner.*